(12) United States Patent
Nilen et al.

(10) Patent No.: US 10,024,112 B2
(45) Date of Patent: Jul. 17, 2018

(54) SUPERHARD CUTTER (75) Inventors: Roger William Nilen, Springs (ZA); Habib Saridikmen, Springs (ZA); Nedret Can, Springs (ZA)

(73) Assignee: ELEMENT SIX ABRASIVES, S.A., Luxembourg (LU)

( * ) Notice: Subject to any disclaimer, the term of this patent is extended or adjusted under 35 U.S.C. 154(b) by 418 days.

(21) Appl. No.: 13/703,598

(22) PCT Filed: Jun. 15, 2011

(86) PCT No.: PCT/PC2011/052598
§ 371 (c)(1),
(2), (4) Date: Feb. 22, 2013

(87) PCT Pub. No.: WO2011/158190
PCT Pub. Date: Dec. 22, 2011

(65) Prior Publication Data
US 2013/0213721 A1 Aug. 22, 2013

Related U.S. Application Data (60) Provisional application No. 61/355,232, filed on Jun. 16, 2010, provisional application No. 61/369,169, filed on Jul. 30, 2010.

(30) Foreign Application Priority Data

Jun. 16, 2010 (GB) .................................. 1010070.9
Jul. 30, 2010 (GB) .................................. 1012842.9

(51) Int. Cl.
*E21B 10/567* (2006.01)
*C22C 26/00* (2006.01)
(Continued)

(52) U.S. Cl.
CPC ............ *E21B 10/567* (2013.01); *B23B 27/14* (2013.01); *B23B 27/148* (2013.01); *C22C 26/00* (2013.01);
(Continued)

(58) Field of Classification Search
CPC .... E21B 10/56; E21B 10/567; E21B 10/5676; E21B 2010/561; E21B 2010/563; B23B 27/14; B23B 27/148
See application file for complete search history.

(56) References Cited

U.S. PATENT DOCUMENTS 4,311,490 A    1/1982    Bovenkerk et al.
4,997,049 A *    3/1991    Tank ..................... B23B 27/141
                                                          175/430

(Continued)

FOREIGN PATENT DOCUMENTS

WO        02/34437 A2    5/2002
WO    2004/106693 A2    12/2004
WO    2007/089590 A2    8/2007

OTHER PUBLICATIONS

Li et al, "FEM analysis on the effect of cobalt content on thermal residual stress in polycrystalline diamond compact" published Apr. 2012, accessed Jul. 9, 2017.*

(Continued)

*Primary Examiner* — Blake E Michener
(74) *Attorney, Agent, or Firm* — Bryan Cave Leighton Paisner LLP (57) ABSTRACT

A cutter comprises a superhard construction, the cutter having a cutting edge defined by a rake face, and a flank extending therefrom. The cutter also has first and second regions, the first region abutting the second region along a boundary, the first region having a different material composition from the second region. At least the second region comprises superhard material, the material of the first region (Continued)

has a different coefficient of thermal expansion (CTE) from the material of the second region. The second region extends around the peripheral edge of the first region defined by the boundary to form a collar therearound, the first region and/or the second region extending to and/or forming at least a part of the rake face.

17 Claims, 10 Drawing Sheets

(51) Int. Cl.
    *B23B 27/14* (2006.01)
    *B22F 3/14* (2006.01)
    *E21B 10/573* (2006.01)
(52) U.S. Cl.
    CPC ...... *E21B 10/5673* (2013.01); *E21B 10/5735* (2013.01); *B22F 3/14* (2013.01); *C22C 2204/00* (2013.01); *Y10T 407/24* (2015.01)

(56) References Cited

U.S. PATENT DOCUMENTS

| | | | |
|---|---|---|---|
| 5,135,061 A | 8/1992 | Newton, Jr. | |
| 5,176,720 A * | 1/1993 | Martell | B22F 7/06 51/293 |
| 5,217,081 A * | 6/1993 | Waldenstrom | C22C 29/08 175/420.2 |
| 5,472,376 A * | 12/1995 | Olmstead | E21B 10/5735 175/428 |
| 5,711,702 A * | 1/1998 | Devlin | B24D 99/00 175/428 |
| 6,145,607 A * | 11/2000 | Griffin | E21B 10/5735 175/426 |
| 6,202,772 B1 | 3/2001 | Eyre | |
| 6,260,640 B1 | 7/2001 | Einset | |
| 6,325,165 B1 * | 12/2001 | Eyre | 175/426 |
| 6,439,327 B1 * | 8/2002 | Griffin et al. | 175/434 |
| 6,446,740 B2 | 9/2002 | Eyre | |
| 7,451,838 B2 * | 11/2008 | Keshavan | 175/426 |
| 7,694,757 B2 | 4/2010 | Keshavan | |
| 8,985,248 B2 * | 3/2015 | DiGiovanni et al. | 175/434 |
| 2006/0207802 A1 * | 9/2006 | Zhang | E21B 10/5676 175/374 |
| 2008/0142267 A1 | 6/2008 | Griffin et al. | |
| 2008/0206576 A1 * | 8/2008 | Qian | B24D 3/10 428/446 |
| 2009/0022952 A1 | 1/2009 | Keshavan | |
| 2012/0151848 A1 * | 6/2012 | Suryavanshi | B22F 5/00 51/309 |

OTHER PUBLICATIONS

Mensa-Wilmot, "Evolution of the Twin-Edge Cutter: Raising the Limits for PDC Bits," Petroleum Engineer International, vol. 70, No. 10, Oct. 1, 1997, pp. 49-52.
International Search Report for PCT/IB2011/052598 dated Nov. 22, 2012.

* cited by examiner

PRIOR ART

SUPERHARD CUTTER

FIELD

This disclosure relates to a cutter comprising a superhard construction, particularly but not exclusively for a rotary drill bit for boring into the earth.

BACKGROUND

Polycrystalline diamond (PCD) material comprises a mass of inter-grown diamond grains and interstices between the diamond grains. PCD may be made by subjecting an aggregated mass of diamond grains to a high pressure and temperature in the presence of a sintering aid such as cobalt, which may promote the inter-growth of diamond grains. The sintering aid may also be referred to as a catalyst material for diamond. Interstices within the sintered PCD material may be wholly or partially filled with residual catalyst material. PCD may be formed on a cobalt-cemented tungsten carbide substrate, which may provide a source of cobalt catalyst material for sintering the PCD.

PCD material may be used in a wide variety of tools for cutting, machining, drilling or degrading hard or abrasive materials such as rock, metal, ceramics, composites and wood-containing materials. For example, tool inserts comprising PCD material are widely used in drill bits used for boring into the earth in the oil and gas drilling industry. In many of these applications, the temperature of the PCD material may become elevated as it engages rock or other workpiece or body with high energy. The working life of tool inserts may be limited by fracture of the superhard material, including by spalling and chipping.

U.S. Pat. No. 4,311,490 discloses a diamond layer comprising diamond grains and having at least two layers, one layer of coarser grains adjacent to a carbide mass and another layer of finer grains adjacent the coarser layer.

U.S. Pat. No. 5,135,061 discloses a cutting element including a cutting table that may comprise at least two distinct layers of superhard material bonded together, the front layer comprising a less wear resistant form of superhard material than the second layer.

European patent No. 1 330 323 discloses an abrasive composite compact comprising a sintered particle layer bonded to a cemented carbide substrate, the abrasive particle layer having three regions containing particles having different size distributions.

U.S. Pat. No. 6,446,740 discloses a cutting element having a cutting table which is formed from segments of an ultra hard material. Preferably, some of the segments are made from finer grade of ultra hard material while the remaining segments are made from a coarser grade of ultra hard material.

U.S. Pat. No. 7,694,757 discloses a cutting element including a TSP material layer over a substrate. TSP material is formed by "leaching" the cobalt from the diamond lattice structure of at least a portion of the PCD, or by forming PCD with a thermally compatible silicon carbide binder instead of cobalt. The TSP layer may include adjacent first, second and third layers, which may have different average diamond grain sizes and different porosities.

U.S. patent application publication No. 2008/0142267 discloses a PCD cutting element, which in operation (and as it wears to a worn condition) presents at least two cutting lips to the material being cut. At least part of the end working surface and at least part of the peripheral working surface are substantially free of catalyzing material. The PCD element may incorporate regions of different abrasion resistance, for example arranged in a series of layers, or in a series of concentric rings.

PCT publication No. WO2007/089590 discloses a shear cutter with functionally designed PCD composite overlay. The tool body can include a plurality of polycrystalline abrasive layers and a plurality of arresting layers. In this application, "arresting" refers to a property and/or effect of a material whereby cracks or other destructive or deteriorating occurrences within one area of material is halted, slowed, reduced, and/or isolated. The layer selections and the interface design amongst the layers can also preferably minimise thermal mismatch stress.

There is a need for a superhard cutter element having improved fracture resistance.

SUMMARY

Viewed from a first aspect there is provided a cutter comprising a superhard construction, the cutter having a cutting edge defined by a rake face, and a flank extending therefrom; and comprising a first region and a second region the first region abutting the second region along a boundary, the first region having a different material composition from the second region, both first and second regions comprising superhard material, wherein the material of the first region has a different coefficient of thermal expansion (CTE) from the material of the second region; the regions being configured such that at least part of the boundary extends generally away from both the rake face and the flank, the boundary also extending generally away from proximate the cutting edge or from the cutting edge.

The second region may extend around the peripheral edge of the first region defined by the boundary to form a collar therearound, the first region and/or the second region extending to and/or forming at least a part of the rake face.

Viewed from a second aspect there is provided a cutter comprising a superhard construction, the cutter having a cutting edge defined by a rake face, and a flank extending therefrom; and comprising a first region and a second region, the first region abutting the second region along a boundary, the first region having a different material composition from the second region, both first and second regions comprising superhard material, wherein the material of the first region has a different coefficient of thermal expansion (CTE) from the material of the second region; the second region extending around the peripheral edge of the first region defined by the boundary to form a collar therearound.

Viewed from a third aspect there is provided a cutter comprising a superhard construction, the cutter having a cutting edge defined by a rake face, and a flank extending therefrom; and comprising a first region and a second region the first region abutting the second region along a boundary, the first region having a different material composition from the second region, the second region comprising superhard material, wherein the material of the first region has a different coefficient of thermal expansion (CTE) from the material of the second region; the second region extending around the peripheral edge of the first region defined by the boundary to form a collar therearound, the first region and/or the second region extending to and/or forming at least a part of the rake face.

In some embodiments, at least one, at least two, or most or all of the regions may comprise, or consist of, polycrystalline superhard (PCS) material. In some embodiments, at least one, at least two, or most or all of the regions comprise, or consist of, superhard composite material. In some embodiments of the invention, at least one region comprises, or consists of, PCS material and at least one region comprises, or consists of, superhard composite material.

In some embodiments, at least part of the boundary may extend from a volume defined by and including: i) a rake face area, which extends on the rake face from the cutting edge (in all directions) a distance of at most about one third, or even at most about one sixth of the distance between the cutting edge and the opposite edge of the rake face; ii) a flank area, which extends on the flank from the cutting edge (in all directions) a distance of at most about one quarter, or even at most about one fifth of the thickness of the superhard construction at the flank; and iii) an internal plane, which extends as between the edges of the rake and flank areas that are remote from the cutting edge. In some embodiments, the rake face area may extend on the rake face from the cutting edge (in all directions) a distance of at most about 4 mm, at most about 2 mm or at most about 1 mm. In some embodiments, the flank area may extend on the flank from the cutting edge (in all directions) a distance of at most about 500 microns or at most about 300 microns. In some embodiments, the flank area extends over the chamfer and a distance along a side surface of the superhard construction towards an interface with a substrate.

In some embodiments, the boundary may intersect the cutting edge or an exposed surface of the cutter, such as the rake face or the flank proximate the cutting edge. In one embodiment, the boundary may intersect a further boundary proximate the cutting edge. In some embodiments, the boundary may intersect a further boundary with a further region within the cutter or by an exposed surface of the cutter, the intersection occurring within at most about 500 microns, at most about 200 microns, at most about 100 microns, or even at most about 50 microns of the cutting edge. In some embodiments, the further boundary may be an exposed surface, such as the rake face, the flank, a surface formed by a chamfer or bevel, or a wear scar formed in use, or the further boundary may be defined by identifiable regions within the cutter.

In one embodiment, the longitudinal or axial thickness of the first region generally increases with increasing distance from proximate the cutting edge or from the cutting edge, such that the mean thickness at a distance remote from the cutting edge is greater than the thickness at or proximate the cutting edge. In one embodiment, the lateral or radial thickness of the second region generally increases with increasing distance from proximate the cutting edge or from the cutting edge, such that the mean thickness at a distance remote from the cutting edge is greater than the thickness at or proximate the cutting edge.

In one embodiment, the boundary may intersect the flank, such that the length of the flank between the cutting edge and the intersection being substantially less than the length of the flank between the intersection and an interface between the superhard construction and a cemented carbide substrate. In some embodiments, the length of the portion of the flank between the cutting edge and the intersection may be at most about 50%, 30%, 10% or even 5% of the total length of the flank between the cutting edge and the interface between the superhard construction and the cemented carbide substrate. In one embodiment, the boundary may intersect the cutting edge and the length the flank between the intersection and the interface with the substrate may be substantially the same as the total length of the flank between at least a part of the cutting edge and the substrate.

In one embodiment, a first region having a first composition disposed between the boundary and the rake face may comprise a first PCS material, and a second region may comprise a second PCS material having a second composition disposed between the boundary and the flank; the first PCS material having a CTE substantially less than that of the second PCS material. In one embodiment, the first PCS material has a CTE of at least about 5% less than that of the second PCS material. In one embodiment, the first region extends from proximate the rake face to the boundary, and in one embodiment, the second region extends from the boundary to proximate the flank.

In one embodiment, the first PCS material may have a substantially higher impact resistance than the second PCS material, and in one embodiment, the first PCS material may have a substantially lower abrasion resistance than the second PCS material. In one embodiment, the first PCS material may have a substantially higher impact resistance and a substantially lower toughness than the second PCS material, the toughness being the K1C toughness. In one embodiment, the first PCS material may be more thermally stable than the second PCS material.

In some embodiments, the first PCS material may comprise grains of a superhard material having a mean size of at least 5 microns and at most 30 microns and the second PCS material may comprise grains of the superhard material having a mean size of at least 0.5 microns and at most 10 microns.

In some embodiments, the first and the second PCS material may comprise respective first and second PCD material, each comprising a metallic catalyst material for diamond, such as cobalt, the first PCD material comprising substantially less cobalt than the second PCD material. In one embodiment of the invention, at least one of the regions is free of a catalyst material for the respective superhard material.

In one embodiment, a first region having a first composition disposed between the boundary and the rake face may comprise a superhard composite material, and a second region may comprise a PCS material disposed between the boundary and the flank. In one embodiment, the first region may extend from proximate the rake face to the boundary, and in one embodiment, the second region may extend from the boundary to proximate the flank.

In some embodiments, the superhard composite material may comprise superhard particles, such as diamond or cBN particles, dispersed within a matrix comprising cemented tungsten carbide. In one embodiment, the superhard composite may comprise at least about 20 volume percent superhard particles, and in one embodiment the superhard composite material may comprise at most about 80 volume percent superhard particles. In some embodiments, the superhard composite material may comprise superhard particles having a mean size of at least about 1 micron, at least about 10 microns, or at least about 50 microns, and in some embodiments, the superhard composite material may comprise superhard particles having a mean size of at most about 1,000 microns, at most about 500 microns, or at most about 100 microns. In one embodiment, the superhard material may comprise superhard grains dispersed in a matrix comprising, or consisting essentially of cemented carbide material, such as cemented tungsten carbide material. In one embodiment, the cemented tungsten carbide may comprise at least about 2 volume percent Co, at least about 4 volume percent cobalt or at least about 6 volume percent Co, and in one embodiment, the superhard material may comprise superhard grains dispersed in a matrix comprising, or consisting essentially of cobalt-cemented tungsten carbide comprising at most about 20 volume percent Co or at most about 10 volume percent Co. In one embodiment, the superhard composite material may have a CTE of at least about $3 \times 10^{-6}$ $K^{-1}$ and at most about $5 \times 10^{-6}$ $K^{-1}$.

In some embodiments, at least part of the boundary may be substantially terraced, stepped or undulating, or at least part of the boundary may exhibit irregularities or discontinuities. In some embodiments, at least part of the boundary may be substantially planar or arcuate, or it may be substantially or generally conical, parabolic or hyperbolic. In one embodiment, the regions may be configured substantially concentrically.

In some embodiments, at least part of the boundary may generally extend from proximate the cutting edge, or from the cutting edge, at an angle with respect to a rake face or an end surface, the angle being at least about 5 degrees, at least about 10 degrees or at least about 20 degrees, and the angle being at most about 60 degrees, at most about 70 degrees or at most about 80 degrees.

In some embodiments, at least a portion of the rake face adjacent the cutting edge may be substantially planar, or substantially the whole of the rake face may be substantially planar.

In one embodiment, the cutter comprises a superhard construction comprising PCS material joined to a cemented carbide substrate.

In some embodiments, the PCS material is polycrystalline diamond (PCD) material or polycrystalline cubic boron nitride (PCBN) material.

In one embodiment, the cutter may be for machining, cutting, boring into or degrading a workpiece or body comprising a hard or abrasive material such as metal, ceramic, wood, composite material, asphalt or rock. In one embodiment, the cutter may be for a drill bit for boring into the earth, as may be used in the oil and gas drilling industry, and in one embodiment, the cutter may be a shear cutter insert for a drill bit.

A method of making a cutter as described above may comprise forming a first structure comprising superhard material and having a recess therein, defining a boundary, introducing precursor material for making a PCS material or a superhard composite material into the recess to form a pre-sinter assembly; and subjecting the pre-sinter assembly in the presence of a sintering aid for the superhard material to a pressure and temperature at with the superhard material is thermodynamically stable and sintering the superhard material.

In one version of the method, the precursor material may comprise an unsintered plurality of blended superhard particles, carbide particles, such as tungsten carbide particles, and a metal such as cobalt.

In one version of the method, the base may be a cemented carbide substrate, a further component comprising grains of the superhard material, or a combination of the substrate and the further component.

In one version of the method, the precursor material may comprise grains of superhard material held together by means of an organic binder material, and in some embodiments, the precursor material may be in the form of sheets, discs, foils, pellets or blocks.

A bit for drilling into rock is also provided, comprising an embodiment of a cutter, the cutting edge being an edge of the superhard construction disposed for cutting the rock.

BRIEF DESCRIPTION OF THE DRAWINGS

Non-limiting embodiments will now be described with reference to the accompanying drawings, in which.

The same reference numbers refer to the same respective features in all drawings.

DETAILED DESCRIPTION OF EMBODIMENTS

As used herein, a "superhard material" is a material having a Vickers hardness of at least about 25 GPa. Diamond and cubic boron nitride (cBN) material are examples of superhard materials.

As used herein, a "superhard construction" means a construction comprising polycrystalline superhard material or superhard composite material, or comprising polycrystalline superhard material and superhard composite material.

Figure 1:
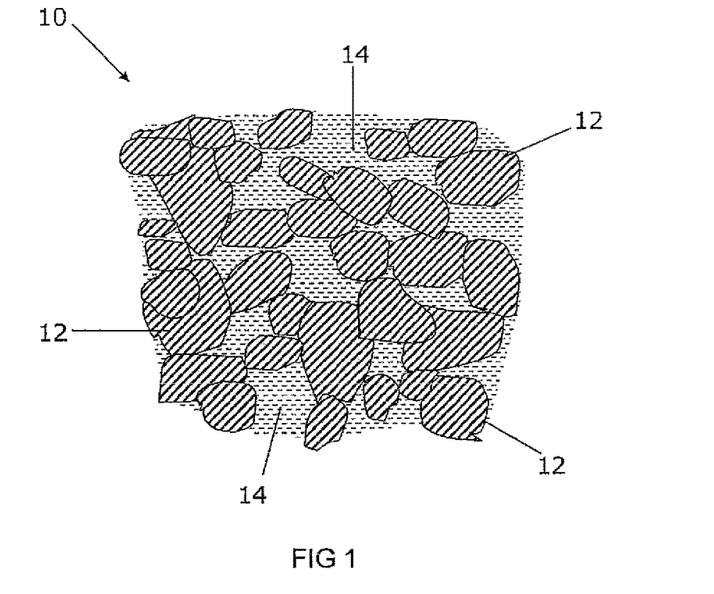
FIG. 1 shows a schematic drawing of the microstructure of an embodiment of a PCS material.

With reference to FIG. 1, a "polycrystalline superhard" (PCS) material 10 comprises a mass of grains 12 of a superhard material and interstices 14 between the superhard grains 12, which may be at least partly filled with filler or binder material, the content of the superhard grains 12 being at least about 50 percent of the material by volume. The grains 12 may comprise diamond or cubic boron nitride (cBN).

As used herein, polycrystalline diamond (PCD) is a PCS material comprising a mass of diamond grains, a substantial portion of which are directly inter-bonded with each other and in which the content of diamond is at least about 80 volume percent of the material. In one embodiment of PCD material, interstices between the diamond gains may be at least partly filled with a binder material comprising a catalyst for diamond. As used herein, "interstices" or "interstitial regions" are regions between the diamond grains of PCD material. In embodiments of PCD material, interstices or interstitial regions may be substantially or partially filled with a material other than diamond, or they may be substantially empty. Embodiments of PCD material may comprise at least a region from which catalyst material has been removed from the interstices, leaving interstitial voids between the diamond grains.

As used herein, polycrystalline cubic boron nitride (PCBN) material is a PCS material comprising a mass of cBN grains dispersed within a wear resistant matrix, which may comprise ceramic or metal material, or both, and in which the content of cBN is at least about 50 volume percent of the material. In some embodiments of PCBN material, the content of cBN grains is at least about 60 volume percent, at least about 70 volume percent or at least about 80 volume percent. Embodiments of superhard material may comprise grains of superhard materials dispersed within a hard matrix, wherein the hard matrix preferably comprises ceramic material as a major component, the ceramic material preferably being selected from silicon carbide, titanium nitride and titanium carbo-nitride.

As used herein, a "superhard composite" material comprises a plurality of grains of a superhard material dispersed within a matrix material, the content of the superhard grains being at least about 10 percent of the superhard composite material by volume.

Figure 2:
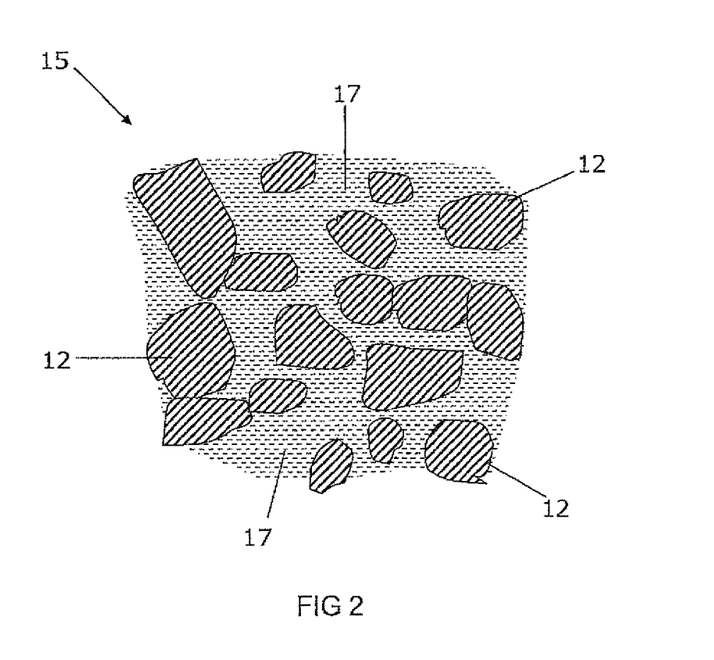
FIG. 2 shows a schematic drawing of the microstructure of an embodiment of a superhard composite material.

With reference to FIG. 2, a "superhard composite" material 15 comprises a plurality of grains 12 of a superhard material dispersed in a matrix 17. The grains 12 may comprise diamond or cubic boron nitride (cBN), and the matrix 17 may comprise or consist essentially of cemented carbide material.

Figure 3:
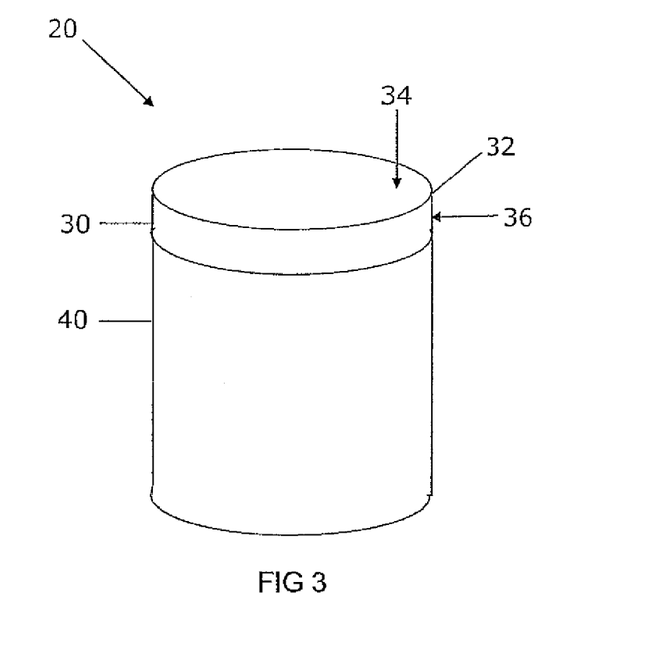
FIG. 3 shows a schematic perspective view of an embodiment of a cutter for a drill bit for boring into the earth.

With reference to FIG. 3, an embodiment of a cutter 20 comprises a superhard construction 30 joined to a support substrate 40, and has a cutting edge 32 defined by the edge of a rake face 34, and a flank 36.

Figure 4:
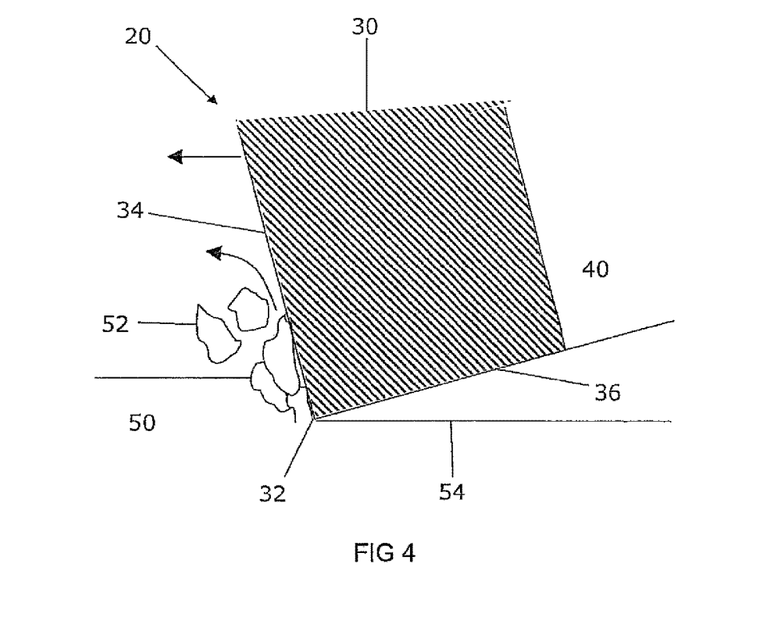
FIG. 4 shows a schematic partial cross section view of a shear cutter for a drill bit in use cutting rock.

With reference to FIG. 4, a "rake face" 34 of an embodiment of a cutter 20 is the surface or surfaces over which the chips 52 flow when the cutter 20 is used to cut material from a body 50, the rake face 34 directing the flow of newly formed chips 52. As used herein, "chips" 52 are the pieces of a body 50 removed from the work surface of the body 54 by a cutter 20 in use. As used herein, a "flank" 36 of a cutter 20 is the surface or surfaces of the cutter 20 that passes over the surface 54 produced on the body 50 by a cutter 20. The flank 36 may provide a clearance from the body 50 and may comprise more than one flank face. As used herein, a "cutting edge" 32 is the edge of a rake face 34 intended to perform cutting of a body 50. A "rounded cutting edge" is a cutting edge that is formed by a rounded transition between the rake face and the flank.

As used herein, a "wear scar" is a surface of a cutter formed in use by the removal of a volume of cutter material due to wear of the cutter. A flank face may comprise a wear scar. As a cutter wears in use, material may be progressively removed from proximate the cutting edge, thereby continually redefining the position and shape of the cutting edge, rake face and flank as the wear scar forms. As used herein, it is understood that the term "cutting edge" refers to the actual cutting edge, defined functionally as above, at any particular stage or at more than one stage of the cutter wear progression up to failure of the cutter, including but not limited to the cutter in a substantially unworn or unused state.

Figure 5:
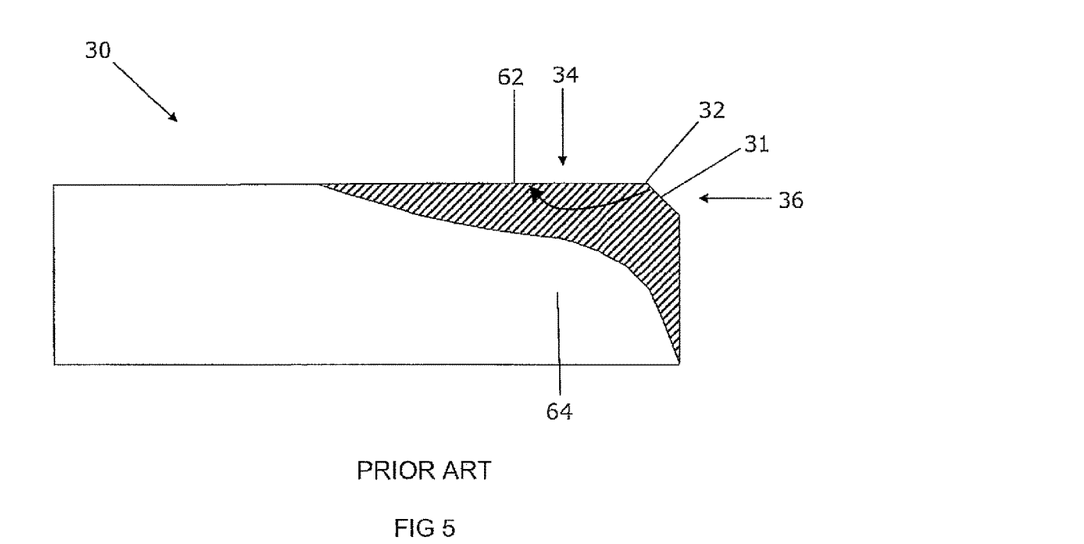
FIG. 5 shows a schematic longitudinal cross section view of an embodiment of a known cutter, with potential radial tensile zone and crack path superimposed (FIG. 5 does not show an embodiment of the invention).

With reference to FIG. 5, an embodiment of a superhard construction 30 for a cutter according to the prior art has a cutting edge 32 formed by an edge of a rake face 34, a chamfer 31 formed into the structure adjacent the cutting edge 32 and a flank 36 that includes the chamfer 31 as a flank face. A zone 62 in a state of radial tension may arise near the cutting edge 32. Cracks generated at or near the cutting edge 32 in use, particularly at the flank 36, may grow in length and propagate away from zones in relative radial compression 64 towards a surface of a zone 62 of relative tension, eventually emerging from the rake face 34, causing a piece of cutter adjacent the cutting edge 32 to become detached in a type of fracture failure known as "spalling". This may limit the effective working life of the cutter.

Figure 6A:
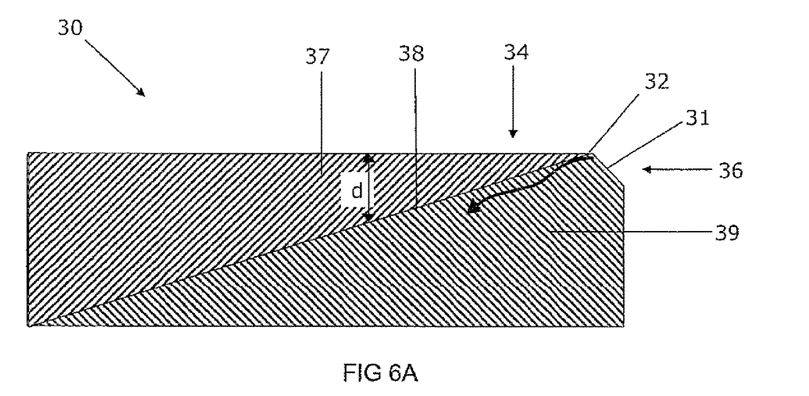
FIG. 6A shows a schematic partial longitudinal cross section view of an embodiment of a cutter in a substantially unworn state, with a potential crack path superimposed.
Figure 6B:
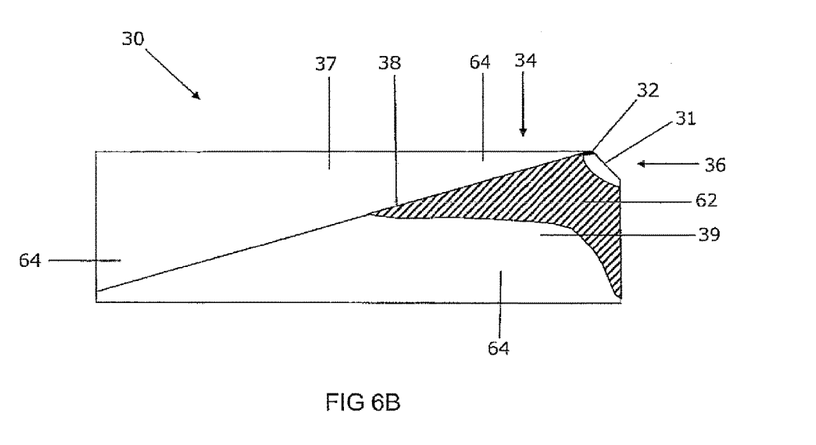
FIG. 6B shows a schematic partial longitudinal cross section view of the embodiment of the cutter shown in FIG. 5A, with potential radial tensile regions and a potential crack path superimposed.

With reference to FIG. 6A and FIG. 6B, an embodiment of a superhard construction 30 for a cutter has a cutting edge 32 formed by an edge of a rake face 34, a chamfer 31 formed into the structure adjacent the cutting edge 32 and a flank 36 that includes the chamfer 31 as a flank face. The embodiment of the superhard construction 30 comprises a boundary 38 between regions 37, 39 of the structure 30. The first region 37 may comprise, for example, superhard composite material and the second region 39 may comprise, for example, polycrystalline diamond (PCD) material; the distance d between the boundary 38 and the rake face 34 increasing as the boundary 38 extends away from the cutting edge 32. While wishing not to be limited by a particular theory, the arrangement of first region 37 and second region 39 may result in a large zone of radial tension 62 and zones of radial compression 64, at least one of which lies near the cutting edge 32 and extends between the rake face 34 and the boundary. This arrangement may result in the deflection of cracks generated at or proximate the cutting edge 32 away from the rake face 34 and into the bulk of the cutter, thereby avoiding or at least delaying spalling or other fracture.

While wishing not to be bound by a particular theory, it is believed that the boundary may be configured to defeat or deflect at least some cracks that originate near the cutting edge, or more particularly from a wear scar or on a part of the flank that is close to the wear scar, and that have the potential to generate spall fractures on the rake face if not defeated or deflected away from the rake face. The boundary may extend from sufficiently proximate the cutting edge to achieve this purpose. In some embodiments, the boundary may extend from a zone of the superhard cutter adjacent the cutting edge, the zone including a cutting edge, part of the rake face adjacent a cutting edge, part of the flank adjacent the cutting edge and an internal volume of the superhard cutter defined between the part of the rake face and the part of the flank.

Figure 7:
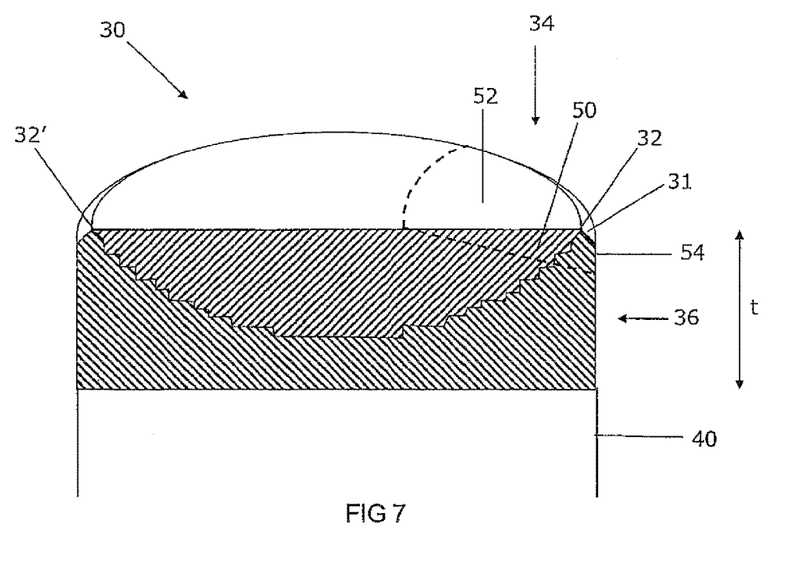
FIG. 7 shows a schematic longitudinal partial cross section view of an embodiment of a cutter.

With reference to FIG. 7, an embodiment of a superhard construction 30 for a superhard cutter has a cutting edge 32, rake face 34, chamfer 31 and flank 36, and a boundary 38 between regions 37, 39 of the structure 30. The boundary 38 has a generally frusto-conical shape and is substantially concentric with the substantially cylindrical side surface of the construction. Part of the part of the boundary 38 extends from a from a volume 50 defined by and including the following areas: a rake face area 52, which extends from the cutting edge 32 in all directions on the rake face 34 a distance of at most about one third of the distance between the cutting edge 32 and the diametrically opposite edge 32'; a flank area 54, which extends from the cutting edge 32 in all directions on the flank 36 a distance of about at most about one quarter, or even at most about one fifth of the thickness t of the superhard construction at the flank 36; and an internal area, which extends as an imaginary surface between the bounds of the rake area 52 and flank area 54.

With reference to FIG. 8 to FIG. 13, these embodiments of superhard constructions 30 for cutters each have cutting edge 32 formed by an edge of a rake face 34, a chamfer 31 formed into the structure adjacent the cutting edge 32, and a flank 36 that includes the chamfer 31 as a flank face. The embodiments of the superhard constructions 30 comprise a boundary 38 between regions 37, 39 of the structure 30, each region comprising a respective polycrystalline diamond (PCD) material or superhard composite material, the material of first region 37 having a different coefficient of thermal expansion (CTE) than that of second region 39; the distance d between the boundary 38 and the rake face 34 increasing as the boundary 38 extends away from the cutting edge 32. The regions 37 and 39 each have complementary shapes to fit together to form the boundary 38.

Figure 8:
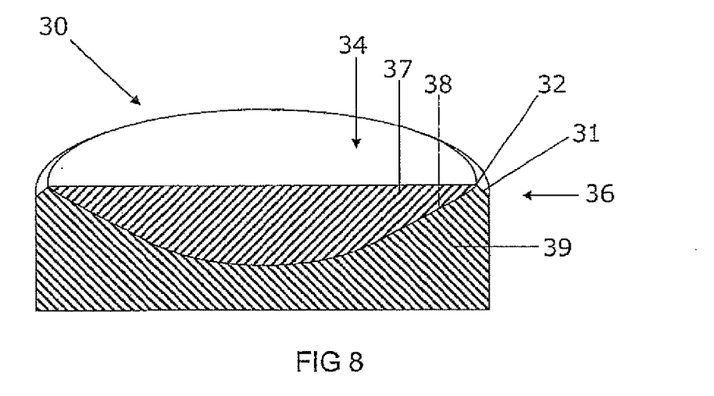
FIG. 8, FIG. 9, FIG. 10, FIG. 11, FIG. 12 and FIG. 13 show respective schematic longitudinal cross section views of embodiments of cutters.

With reference to FIG. 8, the first region 37 adjacent the rake face 34 of an embodiment of a superhard construction 30 may have a generally planar face forming at least a part of the rake face 34 and a base of generally convex shape and fit against a second region 39 having a complementary concave shape, to form a boundary 38 that intersects the edge of the rake face 34, a part of which may form the initial cutting edge 31. The first region 37 is generally of "bowl"-like shape. The first region 37 is bonded to the second region 39 along the boundary 38 and the second region. 39 may be bonded to a cemented carbide substrate (not shown).

Figure 9:
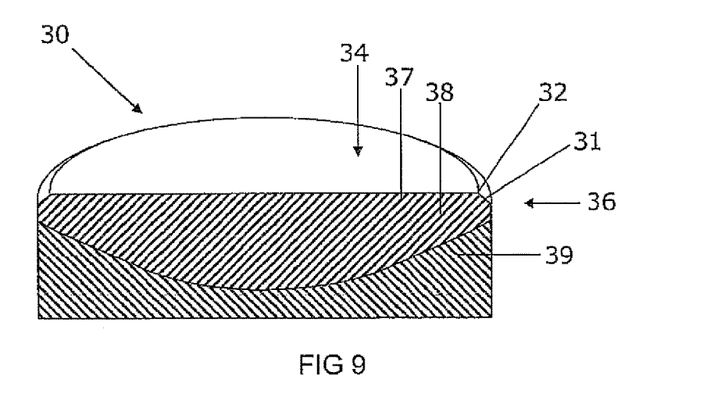

With reference to FIG. 9, the first region 37 adjacent the rake face 34 of an embodiment of a superhard construction 30 may have a generally planar face forming at least a part of the rake face 34 and a base of generally convex shape and fit against a second region 39 having a complementary concave shape, to form a boundary 38 that intersects the flank 36. The first region 37 is generally of "bowl"-like shape. The first region 37 is bonded to the second region 39 along the boundary 38 and the second region 39 may be bonded to a cemented carbide substrate (not shown).

Figure 10:
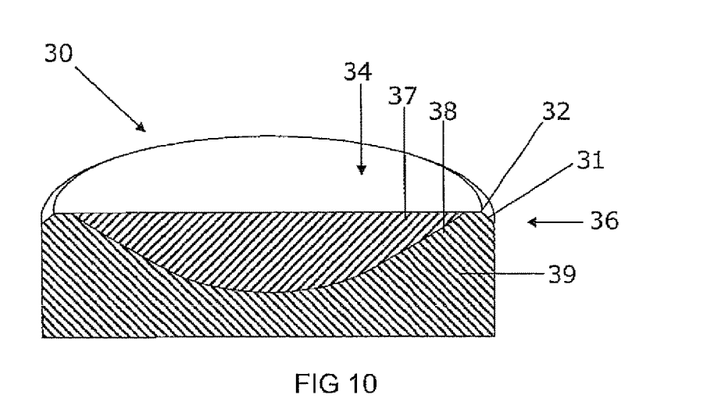

With reference to FIG. 10, the first region 37 adjacent the rake face 34 of an embodiment of a superhard construction 30 may have a generally planar face forming at least a part of the rake face 34 and a base of generally convex shape and fit against a second region 39 having a complementary concave shape, to form a boundary 38 that intersects the rake face 34. The first region 37 is generally of "bowl"-like shape. The first region 37 is bonded to the second region 39 along the boundary 38.

Figure 11:
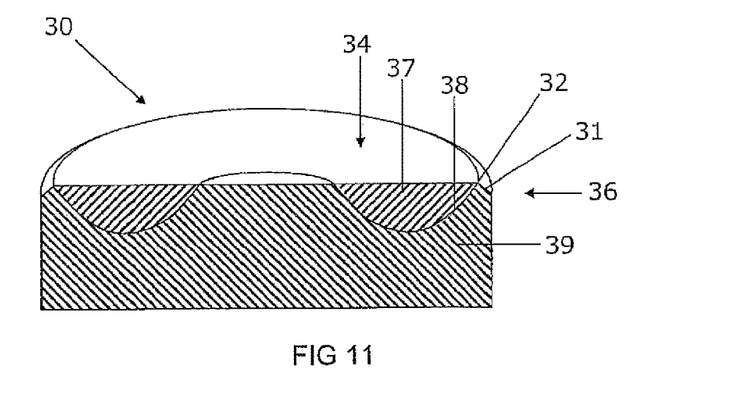

With reference to FIG. 11, the first region 37 adjacent the rake face 34 of an embodiment of a superhard construction 30 may have a generally torroidal shape and fit against a second region 39 having a complementary shape, to form a boundary 38 that intersects the rake face 34, the first region 37 being bonded to the second region 39 along the boundary 38.

Figure 12:
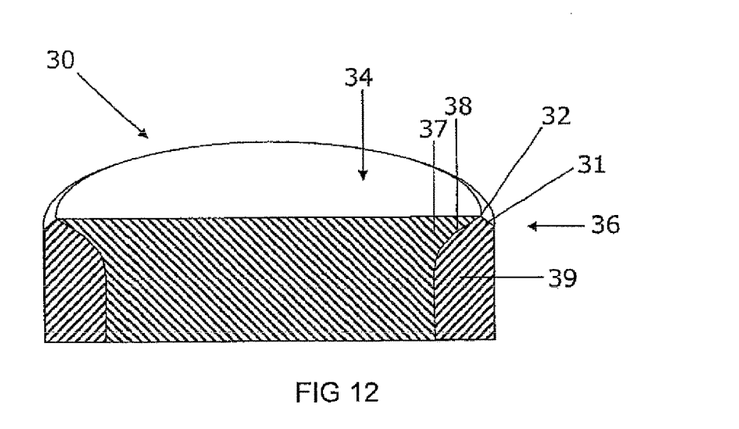

With reference to FIG. 12, the first region 37 adjacent the rake face 34 of an embodiment of a superhard construction 30 may have the general shape of a counter-sunk screw or nail head and fit against a second region 39 having a complementary shape, to form a boundary 38 that intersects the rake face 34. The first region 37 is bonded to the second region 39 along the boundary 38.

Figure 13:
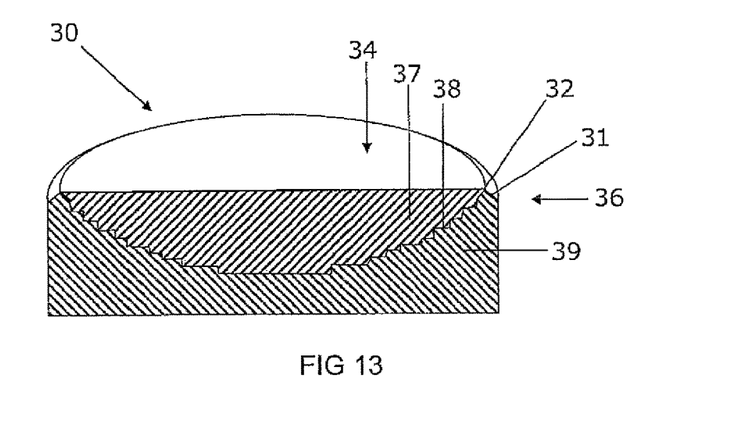

With reference to FIG. 13, the first region 37 adjacent the rake face 34 of an embodiment of a superhard construction 30 may have the general shape of a terraced bowl or dish and fit against a second region 39 having a complementary shape, to form a boundary 38 formed at least partly of a series of steps or terraces. The first region 37 is bonded to the second region 39 along the boundary 38.

Figure 14A:
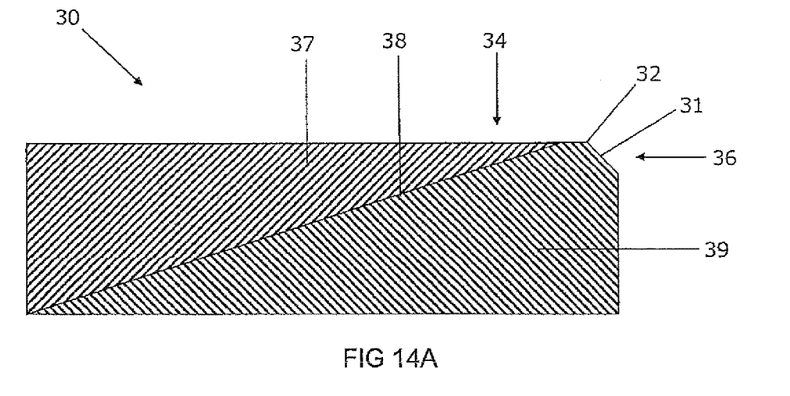
FIG. 14A shows a schematic partial longitudinal cross section view of an embodiment of a superhard construction for a cutter in a substantially unworn state.
Figure 14B:
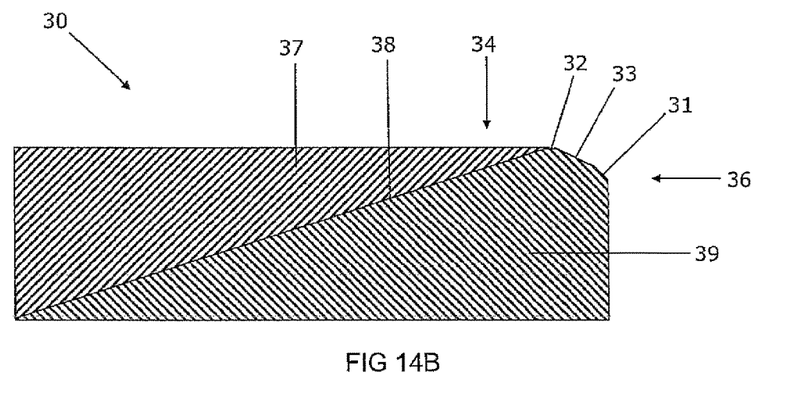
FIG. 14B and FIG. 14C show schematic partial longitudinal cross section views of the embodiment of the superhard construction shown in FIG. 14A in worn states.
Figure 14C:
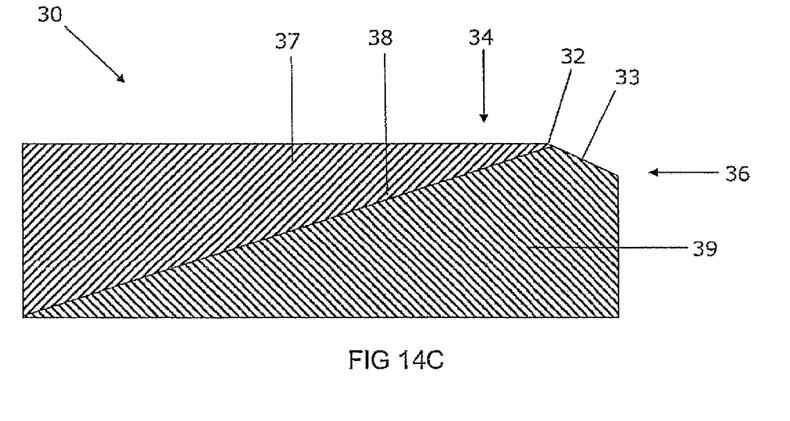

It may be desired to delay the substantial advantageous effect of the boundary until a certain degree of wear of the cutter has been achieved in order to deflect cracks that may become significant only after substantial wear has occurred. With reference to FIG. 14A, an embodiment of a superhard construction 30 for a cutter in a substantially unworn state has a cutting edge 32 formed by an edge of a rake face 34, a chamfer 31 formed into the structure adjacent the cutting edge 32 and a flank 36 that includes the chamfer 31 as a flank face. The embodiment of the superhard construction 30 comprises a first region 37 adjacent the rake face 34 and a second region 39, the first 37 and second 39 regions bonded together to form a boundary 38 that intersects the rake face 34. With reference to FIG. 14B, as the construction wears in use, a wear scar 33 is progressively formed, thereby progressively redefining the shape and position of the cutting edge 32 and progressively eroding away the chamfer until, with reference to FIG. 14C, the cutting edge 32 intersects the boundary 38.

Figure 15:
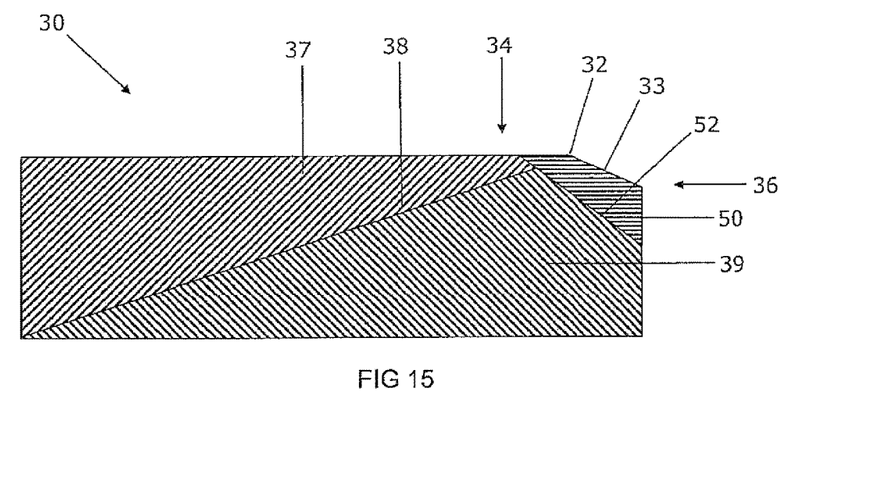
FIG. 15 shows a schematic partial longitudinal cross section view of an embodiment of a superhard construction for a cutter.

FIG. 15 shows an embodiment of a superhard construction 30 comprising PCD material, in which the boundary 38 between region 37 and 39 intersects a further boundary 52 with a further region 50 adjacent the cutting edge 32.

Figure 16A:
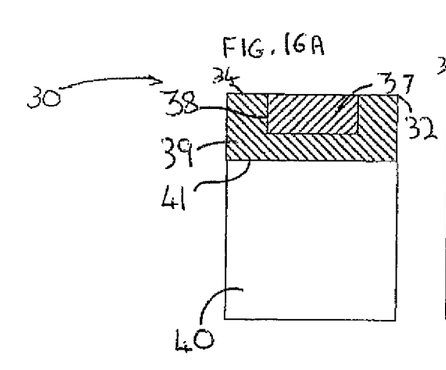
FIGS. 16A to 16F show schematic longitudinal cross sectional views of further embodiments of a cutter.

FIG. 16A shows an embodiment of a superhard construction 30 comprising PCD material, in which the boundary 38 between the first and second regions 37, 39 is such that the first region 37 is a concentric cylinder extending from the rake face 34 towards but not touching a cemented carbide substrate 40 to which the second region 39 is bonded along an interface 41.

In an alternative embodiment (not shown), the first region 37 extends to and forms at least a part of the interface 41 with the substrate 40.

Figure 16B:
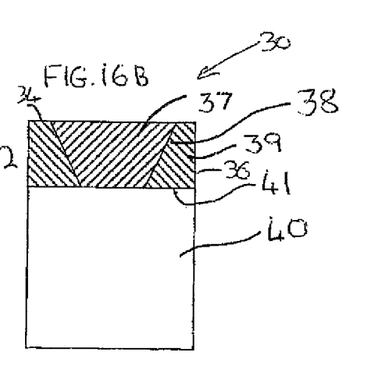
Figures 16C, 16D:
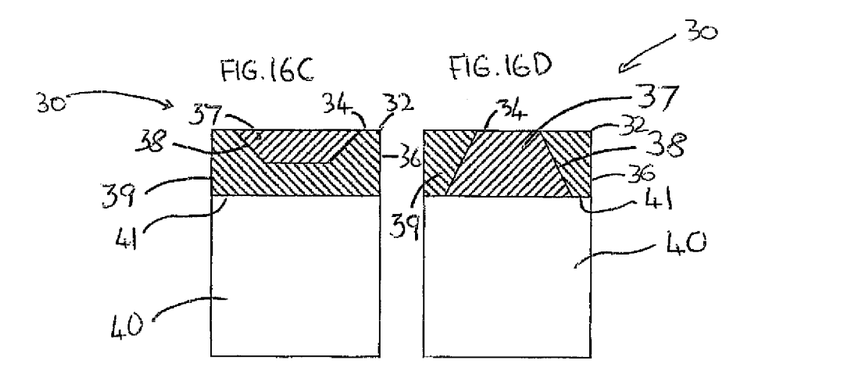

FIGS. 16B and 16C differ from the embodiment of FIG. 16A in that instead of the first region 37 being a right cylinder, it is in the form of a truncated cone. In FIG. 16B, the first region 37 extends from the rake face 34 to the interface 41 with the substrate 40 and the surface of the truncated peak end of the cone forms part of the interface 41 with the substrate 40. By contrast, the first region 37 in the embodiment of FIG. 16C does not extend all the way from the rake face 34 to the interface 41 with the substrate 40, but is spaced from the interface 41.

Figure 16E:
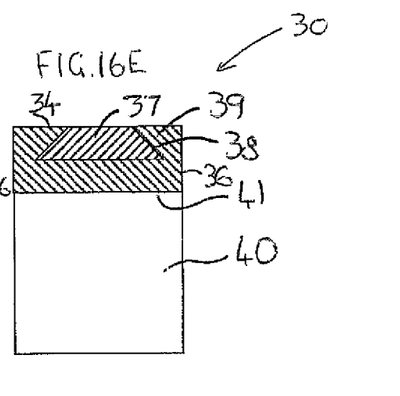
Figure 16F:
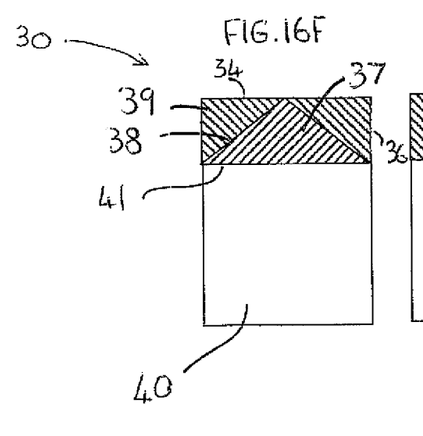

FIGS. 16D and 16E differ from the embodiments of FIGS. 16B and 16C in that the first region 37 is inverted such that the base of the truncated cone forms part of the interface 41 with the substrate 40 in the embodiment of FIG. 16D and is spaced therefrom in FIG. 16F, the truncated peak of the cone forming part of the rake face 34 in both embodiments.

In FIG. 16F, the first region 37 is substantially conical with the peak of the cone touching the rake face 34 and the base of the cone abutting and forming part or all of the interface 41 with the substrate 40.

In some embodiments, for example those shown in FIGS. 16A to 16F, the first region 37 may be formed of, for example, DEC, PCD, PCBN, cemented carbides, nitrides, borides or oxides or a combination thereof. The second region 39 may be formed of, for example PCD, DEC, or PCBN. Furthermore, the first region 37 may be formed of, for example, a plurality of layers, or alternating layers of PCD with adjacent layers being formed of differing PCD grades. The layers could be, for example, around 100 microns in thickness. The effect of forming the first region of multiple layers is intended to assist in controlling crack deflection by manipulating the residual stress distribution in the cutter, effectively channelling the cracks away from sensitive regions in the cutter thereby increasing cutter durability. The layers may lie in a plane substantially parallel to the rake face 34 or in a plane at an angle thereto.

As used herein, a "green body" is a body comprising grains to be sintered and a means of holding the grains together, such as a binder, for example an organic binder. Embodiments of superhard constructions may be made by a method including preparing a green body comprising grains of superhard material and a binder, such as an organic binder. The green body may also comprise catalyst material for promoting the sintering of the superhard grains. The green body may be made by combining the grains with the binder and forming them into a body having substantially the same general shape as that of the intended sintered body, and drying the binder. At least some of the binder material may be removed by, for example, burning it off. The green body may be formed by a method including a compaction process, injection or other molding, extrusion, deposition modelling or other methods. The green body may be formed from components comprising the grains and a binder, the components being in the form of sheets, blocks or discs, for example, and the green body may itself be formed from green bodies. For example, the green body for the superhard construction may be formed from distinct green bodies for each of the respective regions, which may be formed separately into generally the intended shapes of the respective regions and combined to form a boundary defined by a contact interface.

One embodiment of a method for making a green body includes providing tape cast sheets, each sheet comprising a plurality of diamond grains bonded together by a binder, such as a water-based organic binder, and stacking the sheets on top of one another and on top of a support body. Different sheets comprising diamond grains having different size distributions, diamond content or additives may be selectively stacked to achieve a desired structure. The sheets may be made by a method known in the art, such as extrusion or tape casting methods, wherein slurry comprising diamond grains and a binder material is laid onto a surface and allowed to dry. Other methods for making diamond-bearing sheets may also be used, such as described in U.S. Pat. Nos. 5,766,394 and 6,446,740. Alternative methods for depositing diamond-bearing layers include spraying methods, such as thermal spraying.

A green body for the superhard construction may be placed onto a substrate, such as a cemented carbide substrate to form a pre-sinter assembly, which may be encapsulated in a capsule for an ultra-high pressure furnace, as is known in the art. The substrate may provide a source of catalyst material for promoting the sintering of the superhard grains. In some embodiments, the superhard grains may be diamond grains and the substrate may be cobalt-cemented tungsten carbide, the cobalt in the substrate being a source of catalyst for sintering the diamond grains. The pre-sinter assembly may comprise an additional source of catalyst material.

In one version, the method may include loading the capsule comprising a pre-sinter assembly into a press and subjecting the green body to an ultra-high pressure and a temperature at which the superhard material is thermodynamically stable to sinter the superhard grains. In one embodiment, the green body may comprise diamond grains and the pressure is at least about 5 GPa and the temperature is at least about 1,300 degrees centigrade. In one embodiment, the green body may comprise cBN grains and the pressure is at least about 3 GPa and the temperature is at least about 900 degrees centigrade.

An embodiment of a superhard construction may be made by a method including providing a PCD structure and a diamond composite structure, forming each structure into the respective complementary shapes, assembling the PCD structure and the diamond composite structure onto a cemented carbide substrate to form an unjoined assembly, and subjecting the unjoined assembly to a pressure of at least about 5.5 GPa and a temperature of at least about 1,250 degrees centigrade to form a PCD construction.

A version of the method may include making a diamond composite structure by means of a method disclosed, for example, in PCT application publication No. WO2009/128034 for making a super-hard enhanced hard-metal material. A powder blend comprising diamond particles, particles of carbide material and a metal binder material, such as cobalt may be prepared by combining these particles and blending them together. Any effective powder preparation technology may be used to blend the powders, such as wet or dry multi-directional mixing, planetary ball milling and high shear mixing with a homogenizer. In one embodiment, the mean size of the diamond particles may be at least about 50 microns and they may be combined with other particles simply by stirring the powders together by hand. In one version of the method, precursor materials suitable for subsequent conversion into carbide material or binder material may be included in the powder blend, and in one version of the method, metal binder material may be introduced in a form suitable for infiltration into a green body. The powder blend may be deposited in a die or mold and compacted to form a green body, for example by uni-axial compaction or other compaction method, such as cold isostatic pressing (CIP). The green body may be subjected to a sintering process known in the art for sintering similar materials without the presence of diamond, such as may be used to sinter cemented tungsten carbide, to form a sintered article. For example, the green body may be sintered by means of hot pressing or spark plasma sintering. The diamond particles may wholly or partially convert to a non-diamond form of carbon, such as graphite, depending on the sintering conditions. The sintered article may be subjected to a subsequent treatment at a pressure and temperature at which diamond is thermally stable to convert some or all of the non-diamond carbon back into diamond and produce a diamond composite structure. An ultra-high pressure furnace well known in the art of diamond synthesis and the pressure may be at least about 5.5 GPa and the temperature may be at least about 1,250 degrees centigrade.

An embodiment of a superhard construction may be made by a method including providing a PCD structure and a precursor structure for a diamond composite structure, forming each structure into the respective complementary shapes, assembling the PCD structure and the diamond composite structure onto a cemented carbide substrate to form an unjoined assembly, and subjecting the unjoined assembly to a pressure of at least about 5.5 GPa and a temperature of at least about 1,250 degrees centigrade to form a PCD construction. The precursor structure may comprise carbide particles and diamond or non-diamond carbon material, such as graphite, and a binder material comprising a metal, such as cobalt. The precursor structure may be a green body formed by compacting a powder blend comprising particles of diamond or non-diamond carbon and particles of carbide material and compacting the powder blend.

In one embodiment, the superhard construction is formed of PCD and comprises a boundary 38 between a first region 37 and a second region 39, the first region 37 being disposed between the boundary 38 and the rake face 34 and the second region 39 being disposed between the boundary 38 and a flank 36, the PCD material of first region 37 having a lower coefficient of thermal expansion (CTE) than that of second region 38.

PCD material having a desired CTE may be made by selecting the content of the diamond grains, the content and type of filler material, the size distribution or the mean size of the diamond grains. In one embodiment, the PCD comprises diamond and a second phase, the second phase having a CTE substantially greater than that of diamond, such as cobalt. The CTE of diamond is relatively low, being about 1 micron per meter per Kelvin at about room temperature, and the CTE of cobalt is relatively high, being about 13 microns per meter per Kelvin at about room temperature. The CTE of PCD may be estimated using the rule of mixtures, and may be in the range from about 3.5 to about 5. The amount of cobalt or other catalyst material that remains in interstices between the sintered diamonds after the sintering process may depend on the size distribution of the diamond grains, since the amount of catalyst may be limited by the volume of pores between the diamond grains into which it may infiltrate from the substrate or other source of catalyst. In general and all else being equal, the higher the content of cobalt in PCD material, the higher is the CTE of the PCD material. Furthermore, the content of cobalt infiltrant within PCD may generally be higher when the mean size of the diamond grains is lower.

Figure 17:
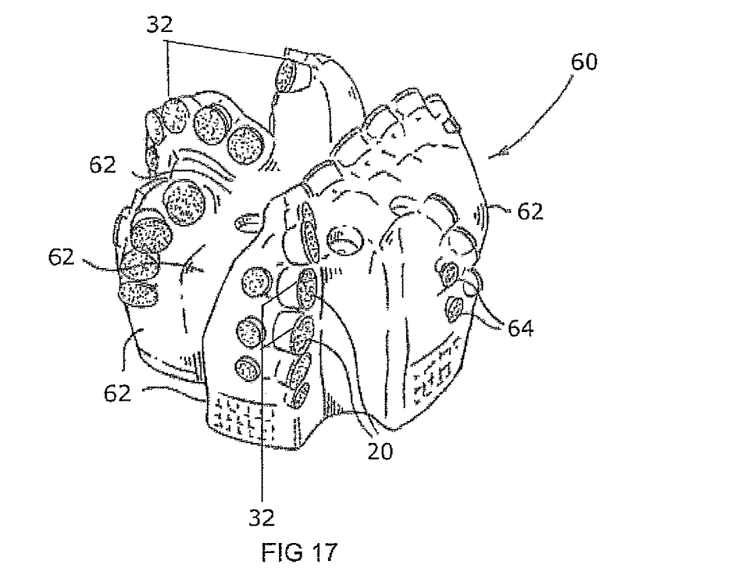
FIG. 17 shows a schematic perspective view of an embodiment of a bit for a drilling into rock.

FIG. 17 shows an embodiment of a bit 60 for drilling into rock comprising embodiments of a cutter 20 mounted onto a bit body 62, the cutting edge being an edge 32 of the superhard construction of the cutter 20 disposed for cutting the rock. The bit 16 may additionally comprise superhard construction 64 for purposes other than cutting rock, such as for protection against wear, for example.

Some embodiments are now described in more detail with reference to the examples below, which are not intended to be limiting.

Example 1

A precursor structure for a diamond composite structure may be provided as follows. A powder blend comprising about 9.3 weight % diamond grains having a mean size of about 6 microns, about 82.7 weight % tungsten carbide grains having a mean size in the range of about 1 micron to about 5 microns, and 8 weight percent cobalt powder may be prepared. The powder blend may be disposed in a compaction die and uni-axially compacted to form a generally conical green body comprising 30 volume % diamond particles and having a cone height of about 5 mm and a diameter of about 16 mm. The green body may be sintered at a temperature of 1,400 degrees centigrade for about 2 hours in a furnace for sintering cemented carbide materials, to produce a precursor structure. The Young's modulus of the resulting diamond composite structure is estimated to be about 715 GPa, the Poisson ratio is estimated to be about 0.182 and the coefficient of thermal expansion is estimated to be about $4.04 \times 10^{-6}$ $K^{-1}$.

A PCD structure comprising at least about 90 volume percent diamond grains having a mean size in the range of about 2 microns to about 5 microns may be provided by sintering diamond grains onto a cemented carbide substrate at a pressure of at least about 5.5 GPa and a temperature of at least about 1,250 degrees centigrade. The PCD structure may have a height of about 2.2 mm and a diameter of about 16 mm. A generally conical depression may be formed by grinding into the PCD structure, the conical surface of the depression extending from the peripheral edge of the PCD structure substantially to the interface between the PCD structure and the substrate. The depression may be configured to accommodate the diamond composite structure.

An unjoined assembly may be provided by inserting the diamond composite structure into the recess of the PCD structure. The unjoined assembly may be encapsulated within a capsule for an ultra-high pressure furnace and subjected to a pressure of at least about 5.5 GPa and a temperature of at least about 1,250 degrees centigrade for about 10 minutes, to form a superhard construction. The superhard construction would comprise a superhard structure comprising a diamond composite structure integrally bonded to a PCD structure, and integrally joined to a cemented carbide substrate.

Example 2

A PCD structure comprising at least about 90 volume percent diamond grains having a mean size in the range of about 2 microns to about 5 microns may be provided by sintering diamond grains onto a cemented carbide substrate at a pressure of at least about 5.5 GPa and a temperature of at least about 1,250 degrees centigrade. The PCD structure may have a height of about 2.2 mm and a diameter of about 16 mm. A generally conical depression may be formed by grinding into the PCD structure, the conical surface of the depression extending from the peripheral edge of the PCD structure substantially to the interface between the PCD structure and the substrate. The depression may be filled with a powder blend comprising about 9.3 weight % diamond grains having a mean size of about 6 microns, about 82.7 weight % tungsten carbide grains having a mean size in the range of about 1 micron to about 5 microns, and 8 weight percent cobalt powder, to form a pre-sinter assembly.

The pre-sinter assembly may be encapsulated within a capsule for an ultra-high pressure furnace and subjected to a pressure of at least about 5.5 GPa and a temperature of at least about 1,250 degrees centigrade for about 10 minutes, to form a superhard construction. The superhard construction would comprise a superhard structure comprising a diamond composite structure integrally bonded to a PCD structure, and integrally joined to a cemented carbide substrate.

Example 3

A PCD structure comprising at least about 90 volume percent diamond grains having a mean size in the range of about 2 microns to about 5 microns may be provided by sintering diamond grains onto a cemented carbide substrate at a pressure of at least about 5.5 GPa and a temperature of at least about 1,250 degrees centigrade. The PCD structure may have a height of about 2.2 mm and a diameter of about 16 mm. A generally conical depression may be formed by grinding into the PCD structure, the conical surface of the depression extending from the peripheral edge of the PCD structure substantially to the interface between the PCD structure and the substrate. The depression may be filled with granules comprising diamond particles having a mean size in the range from about 5 microns to about 15 microns, held together by an organic binder material, to form a pre-sinter assembly.

The pre-sinter assembly may be encapsulated within a capsule for an ultra-high pressure furnace and the organic binder material may be burnt off by heat treating the pre-sinter assembly. The pre-sinter assembly may then be subjected to a pressure of at least about 5.5 GPa and a temperature of at least about 1,250 degrees centigrade for about 10 minutes, to form a superhard construction. The superhard construction would comprise a superhard structure comprising a diamond composite structure integrally bonded to a PCD structure, and integrally joined to a cemented carbide substrate.

While wishing not to be bound by a particular theory, the existence in a PCD body of regions each having a different respective CTE may tend to give rise to a mismatch in residual stress within the PCD body, which may arise from different respective rates of thermal contraction of the regions when the PCD body cools following sintering, for example. This may in turn result in some of the regions being in residual states of compression and other regions being in residual states of tension. As cracks tend to propagate preferentially towards and through regions of tension and away from regions of compression, the fracture of PCD material may be controlled by controlling the stress states of regions within it, which may be achieved by controlling the respective composition of those regions. The residual stress state within a PCD construction may be measured by means of a strain gauge and progressively removing material layer by layer, and applying the strain gauge to the material after successive material removal steps.

In some embodiments of the superhard cutters, cracks originating at the flank 36 may be deflected away from the rake face 34. Furthermore, cracks that arise in, or penetrate across the boundary 38 into the region 37 between the rake face 34 and the boundary 38 may propagate more slowly than in the region 39 between the boundary 38 and the flank 36. One or both of the above may occur and material having relatively low abrasion resistance and strength, as may be disposed adjacent the rake face 34, may be minimally exposed at the flank 36 or wear scar owing to the configuration of the regions 37, 39 and the boundary 38 between them. Such embodiments may exhibit particularly extended working life due to the combined benefits of reduced spelling and high abrasion resistance at or proximate the cutting edge, particularly on the flank or wear scar.

The invention claimed is:

1. A cutter comprising a superhard construction, the cutter having a cutting edge defined by a rake face, and a flank extending therefrom; and comprising a first region and a second region, the first region abutting the second region along a boundary, the first region having a different material composition from the second region, both first and second regions comprising superhard material, wherein the material of the first region has a different coefficient of thermal expansion (CTE) from the material of the second region; and the first region is disposed between the boundary and the rake face and forms at least a part of the rake face; the regions being configured such that at least part of the boundary extends generally away from both the rake face and the flank, the at least part of the boundary also extending generally away from proximate the cutting edge or from the cutting edge, the second region extending around the peripheral edge of the first region defined by the boundary to form a collar therearound, wherein the first region has a first composition, the first region comprising a superhard composite material comprising at least 20 volume percent diamond particles dispersed in a matrix comprising cemented carbide material; and wherein the second region comprises a polycrystalline superhard (PCS) material and is disposed between the boundary and the flank.

2. A cutter according to claim 1 wherein the first region extends to at least a part of the rake face.

3. A cutter according to claim 1, wherein the second region extends to and forms at least a part of the rake face.

4. A cutter as claimed in claim 1, wherein the PCS material comprises polycrystalline diamond (PCD) material.

5. A cutter as claimed in claim 1, wherein the boundary intersects the cutting edge or an exposed surface of the cutter proximate the cutting edge.

6. A cutter as claimed in claim 1, wherein the boundary intersects a further boundary within at most about 500 microns of the cutting edge, the further boundary being defined by an exposed surface of the cutter or by regions within the cutter.

7. A cutter as claimed in claim 1, wherein at least part of the boundary is disposed at an angle with respect to the rake face or an end surface, the angle being at least 5 degrees and at most 80 degrees.

8. A cutter as claimed in claim 1, wherein the first and second regions are concentric.

9. A cutter as claimed in claim 1, wherein at least a portion of the rake face adjacent the cutting edge is substantially planar.

10. A cutter as claimed in claim 1, wherein at least one of the first or second regions is substantially free of a catalyst material for the respective superhard material.

11. A cutter as claimed in claim 1, adapted for a rotary drill bit for boring into the earth.

12. A cutter as claimed in claim 1, wherein the material of first region has a lower coefficient of thermal expansion (CTE) than the material of the second region.

13. A method of making a cutter as claimed in claim 1, the method comprising forming a first structure comprising superhard material and having a recess therein, defining a boundary, introducing precursor material for making a PCS material or a superhard composite material into the recess to form a pre-sinter assembly; and subjecting the pre-sinter assembly in the presence of a sintering aid for the superhard material to a pressure and temperature at which the superhard material is thermodynamically stable and sintering the superhard material.

14. A method as claimed in claim 13, the precursor material comprising an unsintered plurality of blended superhard particles, carbide particles and metal.

15. A method as claimed in claim 13, the precursor material comprising grains of superhard material held together by means of an organic binder material.

16. A method as claimed in claim 13, the precursor materials being in the form of sheets, discs, foils, pellets or blocks.

17. A cutter according to claim 1 wherein the second region extends around the peripheral edge of the first region defined by the boundary to form a collar therearound, the second region to at least a part of the rake face.

* * * * *